(12) United States Patent
Lankinen

(10) Patent No.: US 9,163,835 B2
(45) Date of Patent: Oct. 20, 2015

(54) THERMAL POWER BOILER

(75) Inventor: Pentti Lankinen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 384 days.

(21) Appl. No.: 13/318,217

(22) PCT Filed: May 7, 2010

(86) PCT No.: PCT/FI2010/050371
§ 371 (c)(1),
(2), (4) Date: Dec. 15, 2011

(87) PCT Pub. No.: WO2010/128213
PCT Pub. Date: Nov. 11, 2010

(65) Prior Publication Data
US 2012/0285439 A1 Nov. 15, 2012

(30) Foreign Application Priority Data
May 8, 2009 (FI) ...................................... 20095519

(51) Int. Cl.
*F24H 1/00* (2006.01)
*F23L 15/02* (2006.01)
*F22B 31/08* (2006.01)

(52) U.S. Cl.
CPC *F23L 15/02* (2013.01); *F22B 31/08* (2013.01)

(58) Field of Classification Search
CPC ......... F23L 15/02; F23L 15/04; F23L 15/045; F22D 1/36; F22D 1/38; F22B 31/08; F23B 31/08
USPC .................. 126/117, 344; 60/39.511, 39.512; 122/14; 165/8
See application file for complete search history.

(56) References Cited

U.S. PATENT DOCUMENTS 2,480,277 A * 8/1949 Yerrick .............................. 165/5
2,582,830 A * 1/1952 Hawley ......................... 122/1 R
(Continued)

FOREIGN PATENT DOCUMENTS

DE 976 167 C 4/1963
EP 0 661 498 A2 7/1995
(Continued)

OTHER PUBLICATIONS

Chinese Official Action dated Sep. 6, 2013, issued in corresponding Chinese Patent Application No. 201080020222.X, with an English translation.

(Continued)

*Primary Examiner* — Avinash Savani
*Assistant Examiner* — Deepak Deean
(74) *Attorney, Agent, or Firm* — Fitzpatrick Cella Harper & Scinto

(57) ABSTRACT

A thermal power boiler includes a furnace having a rear wall. A flue gas channel connected to the furnace includes a vertical back pass arranged on the rear wall side of the furnace. An ash hopper in the lower portion of the back pass has (i) a front wall, (ii) a rear wall, and (iii) two sidewalls. A pre-heater preheats combustion air and is provided with an inlet channel for flue gas connected to the preheater. The inlet channel has vertical portions, with an upper portion being attached to the lower portion of the back pass near the ash hopper. The inlet channel includes two adjacent channel portions connected to opposite sides of the back pass. One of the two portions is directly connected to the front wall of the ash hopper, and the other is directly connected to the rear wall of the ash hopper.

11 Claims, 3 Drawing Sheets

(56) References Cited

U.S. PATENT DOCUMENTS

| | | | |
|---|---|---|---|
| 2,594,471 A * | 4/1952 | Marshall | 165/145 |
| 2,688,466 A * | 9/1954 | Baver | 165/97 |
| 2,795,213 A * | 6/1957 | Cooper | 122/1 A |
| 2,821,366 A * | 1/1958 | Karlsson | 165/7 |
| 2,863,723 A * | 12/1958 | Tigges | 423/531 |
| 2,985,152 A * | 5/1961 | Paulison, Jr. | 122/479.4 |
| 2,990,791 A * | 7/1961 | Busquet | 110/162 |
| 3,057,165 A * | 10/1962 | Hawley | 60/662 |
| 3,060,906 A * | 10/1962 | Rawdon | 122/478 |
| 3,063,431 A * | 11/1962 | Miller | 122/478 |
| 3,095,863 A * | 7/1963 | Parmakian | 122/479.1 |
| 3,126,945 A * | 3/1964 | Kuhner | 165/6 |
| 3,146,762 A * | 9/1964 | Blodgett | 122/479.1 |
| 3,150,643 A * | 9/1964 | Parmakian | 122/479.6 |
| 3,160,146 A * | 12/1964 | Kuhner | 122/478 |
| 3,182,640 A * | 5/1965 | Miller | 122/479.3 |
| 3,246,635 A * | 4/1966 | Powell et al. | 122/479.1 |
| 3,321,011 A * | 5/1967 | Kalbfleisch et al. | 165/7 |
| 3,324,837 A * | 6/1967 | Gorzegno et al. | 122/406.4 |
| 3,345,975 A * | 10/1967 | Stevens et al. | 122/406.4 |
| 3,368,534 A * | 2/1968 | Gorzegno et al. | 122/480 |
| 3,692,096 A * | 9/1972 | Pettersson et al. | 165/7 |
| 3,872,836 A * | 3/1975 | Gorzegno et al. | 122/406.4 |
| 4,018,265 A * | 4/1977 | Schluter | 165/7 |
| 4,097,252 A * | 6/1978 | Kirchhoff et al. | 96/74 |
| 4,114,680 A * | 9/1978 | Kritzler et al. | 165/4 |
| 4,160,009 A * | 7/1979 | Hamabe | 422/108 |
| 4,197,905 A * | 4/1980 | Gollnick et al. | 165/4 |
| 4,403,571 A * | 9/1983 | Kochey, Jr. | 122/1 A |
| 4,442,783 A * | 4/1984 | Pajonas et al. | 110/347 |
| 4,487,252 A * | 12/1984 | Natale | 165/7 |
| 4,501,204 A * | 2/1985 | McCartney et al. | 110/264 |
| 4,582,122 A * | 4/1986 | Fan | 165/7 |
| 4,592,293 A * | 6/1986 | Toyama et al. | 110/347 |
| 4,602,573 A * | 7/1986 | Tanca | 110/342 |
| 4,738,226 A * | 4/1988 | Kashiwazaki et al. | 122/480 |
| 4,756,891 A * | 7/1988 | Ohlmeyer et al. | 423/239.1 |
| 4,940,567 A * | 7/1990 | Ohlmeyer et al. | 422/173 |
| 5,220,875 A | 6/1993 | Cox | |
| 5,241,915 A * | 9/1993 | Breen et al. | 110/347 |
| 5,293,841 A * | 3/1994 | Suhr et al. | 122/1 A |
| 5,339,755 A | 8/1994 | Smith | |
| 5,375,538 A * | 12/1994 | Goussu et al. | 110/234 |
| 5,423,272 A * | 6/1995 | Dunn et al. | 110/347 |
| 5,482,027 A * | 1/1996 | Stiller | 126/99 R |
| 5,488,916 A * | 2/1996 | Bozzuto | 110/347 |
| 5,555,849 A * | 9/1996 | Wiechard et al. | 122/4 D |
| 5,814,284 A * | 9/1998 | Schluter | 422/175 |
| 5,915,340 A * | 6/1999 | Cronin et al. | 122/1 A |
| 5,976,224 A * | 11/1999 | Durant et al. | 95/268 |
| 6,039,008 A * | 3/2000 | Anderson et al. | 122/510 |
| 6,105,517 A * | 8/2000 | Swithenbank | 110/344 |
| 6,257,155 B1 * | 7/2001 | Greene | 110/163 |
| 6,405,791 B1 * | 6/2002 | Lieb et al. | 165/158 |
| 6,494,255 B2 * | 12/2002 | Lieb et al. | 165/159 |
| 6,530,209 B2 * | 3/2003 | Kuwabara et al. | 60/39.511 |
| 7,021,248 B2 * | 4/2006 | McNertney et al. | 122/7 R |
| 7,198,769 B2 * | 4/2007 | Cichanowicz | 423/239.1 |
| 7,350,471 B2 * | 4/2008 | Kalina | 110/348 |
| 7,438,876 B2 * | 10/2008 | Cichanowicz | 423/210 |
| 7,475,544 B2 * | 1/2009 | Counterman | 60/653 |
| 7,776,297 B2 * | 8/2010 | Cichanowicz | 423/239.1 |
| 8,196,532 B2 * | 6/2012 | Andrus et al. | 110/245 |
| 8,327,809 B2 * | 12/2012 | Alexander et al. | 122/1 A |
| 8,382,470 B2 * | 2/2013 | Kinnunen | 431/7 |
| 8,955,466 B2 * | 2/2015 | Harrison | 122/1 A |
| 2002/0096316 A1 * | 7/2002 | Lieb et al. | 165/144 |
| 2004/0074814 A1 * | 4/2004 | Baglione et al. | 209/133 |
| 2006/0090468 A1 * | 5/2006 | Counterman | 60/659 |
| 2006/0199120 A1 * | 9/2006 | Kalina | 431/9 |
| 2008/0142608 A1 * | 6/2008 | Krogmann | 237/12.1 |
| 2009/0013941 A1 * | 1/2009 | Alexander et al. | 122/1 A |
| 2009/0095440 A1 * | 4/2009 | Gietz et al. | 165/4 |
| 2009/0211500 A1 * | 8/2009 | Andrus et al. | 110/216 |
| 2010/0212610 A1 * | 8/2010 | Harrison | 122/421 |
| 2010/0257837 A1 * | 10/2010 | Schroder et al. | 60/39.15 |
| 2011/0030235 A1 * | 2/2011 | Brancuzsky et al. | 34/384 |

FOREIGN PATENT DOCUMENTS

| | | | | |
|---|---|---|---|---|
| JP | 61-107002 A | | 5/1986 | |
| JP | 62-141408 A | | 6/1987 | |
| JP | 03-070902 A | | 3/1991 | |
| JP | 5-17301 U | | 3/1993 | |
| JP | 09318005 A | * | 12/1997 | F22B 31/08 |
| JP | 2000291947 A | * | 10/2000 | F23L 15/00 |
| JP | 2002-139216 A | | 5/2002 | |
| JP | 2001-082735 A | | 3/2011 | |
| KR | 20040080217 A | | 9/2004 | |
| RU | 2083925 C1 | | 7/1997 | |
| RU | 2303198 C1 | | 7/2007 | |

OTHER PUBLICATIONS

Notification of and International Search Report issued in counterpart International Application No. PCT/FI2010/050371, mailed Jun. 28, 2011.

Written Opinion of the International Searching Authority issued in counterpart International Application No. PCT/FI2010/050371, mailed Jun. 28, 2011.

Finnish Office Action dated Feb. 22, 2010, issued in counterpart Finnish patent application No. 20095519.

Japanese Office Action dated May 24, 2013, issued in corresponding Japanese Patent Application No. 2012-509070, with an English translation.

Russian Decision on Grant issued Jan. 16, 2013, in counterpart Russian patent application No. 2011149782/06(074775), with an English translation.

Korean Official Action dated Jan. 16, 2013, issued in counterpart Korean patent application No. 10-2011-7026227, with an English translation.

Japanese Office Action dated Feb. 28, 2014, issued in counterpart Japanese Patent Application No. 2012-509070, with a English translation.

Partial English translation of Japanese Patent Document No. 3-65002.

Chinese Official Action dated Apr. 2, 2014, issued in counterpart Chinese Patent Application No. 201080020222.X, with an English translation.

* cited by examiner

THERMAL POWER BOILER

This application is a U.S. national stage application of PCT International Application No. PCT/FI2010/050371, filed May 7, 2010, published as PCT Publication No. WO 2010/128213 A2, and which claims priority from Finnish patent application number 20095519, filed May 8, 2009.

FIELD OF THE INVENTION

The present invention relates to a thermal power boiler comprising a furnace having a rear wall, a flue gas channel connected to the furnace, the flue gas channel comprising a back pass arranged on the rear wall side of the furnace, and a pre-heater for combustion air provided with an inlet channel for flue gas, the upper portion of the inlet channel for flue gas being connected to the lower portion of the back pass, and a flow channel for combustion air arranged adjacent to the inlet channel for flue gas for leading pre-heated combustion air to the furnace.

There is a tendency to increase the capacity of thermal power boilers, such as circulating fluidized bed boilers, by shifting to larger and larger units. For example, the capacity of the largest manufactured circulating fluidized bed boiler is nowadays 460 MWe, but there are already plans for constructing 600 MWe and even 800 MWe plants. One of the essential problems with high capacity thermal power boilers is that the size of the plant grows significantly, which increases the construction costs and makes locating the plant in a particular location more difficult.

BACKGROUND OF THE INVENTION

Pre-heating of the combustion air by means of the heat of the flue gas is one of the standard methods to improve the capacity of a thermal power boiler. The pre-heaters for pre-heating combustion air can be divided into recuperative and regenerative pre-heaters. In the recuperative pre-heaters, heat is conducted through heat surfaces directly from the flue gas to the combustion air, whereas in the regenerative pre-heaters, the flue gas first heats storage mass, usually a metal or a ceramic battery, which, in the second stage, emits heat to the combustion air.

The regenerative pre-heaters are common especially in the large thermal power boilers due to their relatively small size. In the so-called rotary plane pre-heaters that are most commonly used, the heat storage mass rotates slowly, usually, 3-5 rpm in such a way that it is alternately in contact with the flue gas flow and the combustion air. In the pre-heaters for combustion air with a stationary plane, the storage mass remains still, but the connecting conduits for flue gas and combustion air comprise a rotary member, by means of which, the gases are guided to flow alternately through different sectors of the storage mass.

For example, U.S. Pat. No. 5,915,340 discloses a regenerative pre-heater for combustion air with a four-sector rotary plane, in which the flue gas flows through one flow sector, and primary air and first and second secondary air through the three other flow sectors. The rotary axis of the regenerative pre-heater for combustion air can be either horizontal or vertical, but, especially, pre-heaters with a vertical rotary axis are discussed below. The present invention is especially related to pre-heaters for combustion air, in which the flue gas flows through a pre-heater downwards and the combustion air upwards, respectively.

According to the prior art, the furnace, back pass and pre-heater for combustion air of a thermal power boiler are located one after another in the direction of the normal of the rear wall or side wall of the furnace, as disclosed, for example, in FIG. 2 of U.S. Pat. No. 5,915,340. The back pass refers, in this connection, to a vertical portion of the first flue gas channel, which usually comprises heat exchangers, such as superheaters, reheaters and pre-heaters for feed water.

In the lower part of the back pass, there is usually a turn channel, from the farthest edge of which, with respect to the furnace, the flue gas channel extends towards the pre-heater for combustion air. There is actually, at the bottom of the turn channel, an ash hopper collecting flue gas particles. Usually, the flue gas channel comprises, after the turn channel, first, a horizontal or inclined channel portion, which is directed away from the furnace, and then, a vertical channel portion, which leads to the upper portion of the pre-heater for combustion air.

When the furnace of a large thermal power boiler, back pass and pre-heater for combustion air are arranged conventionally one after another, the channels connecting them to each other can become long, whereby the design and assembly thereof among the other equipment and parts related to the furnace is complicated. Each portion and bend of the flue gas channel requires space, which could otherwise be used for locating other parts, for example, fuel treatment equipment.

In order to have different flow sectors of the pre-heater for combustion air wide enough to keep the pressure losses reasonable, the diameter of a regenerative pre-heater for combustion air to be arranged in a large thermal power boiler can be very large. It is also known that the flue gas channel of a large thermal power boiler is divided into two portions, which lead into two adjacent pre-heaters for combustion air, whereby the size of an individual pre-heater remains reasonable and the assembly thereof is relatively easy.

As the flue gas is usually guided from a pre-heater for combustion air further to the cleaning apparatuses for flue gas, for example, to a dust separator, it is natural to arrange the pre-heater in such a way that the inlet and outlet connections for the flue gas are in the portion of the pre-heater that is the farthest from the furnace. Thereby, the inlet and outlet connections for the combustion air are on the furnace side of the pre-heater, respectively. In the regenerative pre-heaters for combustion air with a rotary plane, the inlet and outlet connections for flue gas are, naturally, in the same portion of the pre-heater as the flow sector for flue gas, and the inlet and outlet connections for combustion air are in the same portion of the pre-heater as the flow sector for combustion air, respectively. In the regenerative pre-heaters with a stationary plane, the inlet and outlet connections for combustion air and flue gas are stationary, but the flow sectors for combustion air and flue gas rotate with the rotary members of the respective connecting conduits.

FIG. 1 of U.S. Pat. No. 7,438,876 discloses a conventional embodiment in accordance with the prior art, in which a regenerative pre-heater for combustion air with a rotary plane is arranged outwards from the furnace with respect to the back pass and the flow sector of combustion air in the pre-heater is in the furnace side of the pre-heater. A problem with such an arrangement is that the channel for combustion air must be bent in the next stage underneath the back pass, which, in practice, usually leads into a complicated channel structure. FIG. 9 of U.S. Pat. No. 7,438,876 discloses another possible alternative in which the flow sector of the pre-heater for combustion air is arranged away from the furnace. This arrangement is advantageous when there is a second, recuperative pre-heater for combustion air arranged above the regenerative pre-heater for combustion air, and connected in series therewith, through which pre-heater, the combustion air is guided to the side of the furnace.

SUMMARY OF THE INVENTION

An objective of the present invention is to provide a thermal power boiler, in which the problems of the prior art described above are minimized. It is, especially, an object to provide a large thermal power boiler, the size of which has been maintained to be reasonable.

In order to minimize the problems of the prior art described above, a thermal power boiler is provided. It is a characteristic feature of the present thermal power boiler that the inlet channel for flue gas comprises two adjacent channel portions, which adjacent channel portions are connected to the opposite sides of the back pass.

The cross section of the back pass is usually of rectangular shape in such a way that the side wall of the back pass facing the furnace and the side wall opposite thereto are broader than the side walls perpendicular to them. Especially, when such a rectangular back pass is considered to be divided into a front portion on the furnace side and a rear portion opposite thereto, one of the parallel channel portions is connected, according to an especially advantageous embodiment of the invention, to the front portion of the back pass and the other to the rear portion of the back pass.

According to the present invention, the inlet channel for the flue gas is, in other words, both of the channel portions of the inlet channel for flue gas are, connected to the lower portion of the back pass. The channel portions, preferably, can be connected to the side walls of the back pass immediately above an ash hopper in the lower portion of the back pass, but, most preferably, they are connected to the back pass in the area of the ash hopper thereof. Thereby, one of the adjacent channel portions is, preferably, connected to the front portion of the ash hopper and the other one to the rear portion thereof.

The pre-heater combustion air can be of any type, in which the pre-heater is connected to an inlet channel for flue gas, which inlet channel is connected at its other end to the lower portion of the back pass, and has a flow channel for combustion air, connected to the pre-heater, arranged adjacent to the inlet channel. The pre-heater for combustion air is, however, advantageously a regenerative pre-heater with a rotary plane and comprises a battery of storage mass. Preferably, the rotary axis of the rotary plane of the pre-heater for combustion air is vertical.

The portions of the inlet channels for flue gas connected to the opposite sides of the back pass, especially, to the front portion and rear portion thereof, render it possible to connect the pre-heater for combustion air to the back pass symmetrically, in a compact and operationally efficient way. The portions of the channel symmetrically connected to the back pass provide that the flow of the flue gas and the particles entrained therewith in the back pass are even and symmetric, which is why the lower portion of the back pass can easily be designed so that the wearing thereof is relatively mild. Furthermore, the ash hopper in the lower portion of the back pass can be designed in such a way that the separation of the particles from the flue gas flow to the ash hopper is especially efficient.

The arrangement in accordance with the conventional technique, in which the inlet channel for flue gas leading to the pre-heater for combustion air is connected merely to the rear portion of the back pass, almost inevitably results in the pre-heater for combustion air being relatively far from the furnace. The channels for the flue gas and the combustion air thereby become relatively long and complicated. The symmetrical arrangement of the channel portions of the back pass offers a possibility to such an embodiment of the present invention, in which the inlet channel for flue gas is, preferably, at least partially, more preferably, mainly, and most preferably, completely, underneath the back pass. The inlet channel for flue gas underneath the back pass can thereby be preferably realized in such a way that it is completely, or at least mainly, vertical. The absence of horizontal channel portions decreases the accumulation of ash in the inlet channel, whereby the dimensioning weight of the channel decreases, and the costs caused by the channel remain low.

A pre-heater for combustion air, arranged according to the invention can be arranged relatively close to the furnace, whereby an especially compact structure is provided, in which the channel for flue gas and combustion air remain relatively short. Owing to the compact structure, it is possible to provide a relatively small building for the thermal power boiler, whereby the costs remain low.

The pre-heater for combustion air comprises an inlet connection for flue gas, connecting to the inlet channel for flue gas to the pre-heater for combustion air. According to a preferred embodiment of the present invention, the pre-heater for combustion air is arranged in such a way that the inlet connection for flue gas is at least partially, most preferably, completely, underneath the back pass.

Respectively, the pre-heater for combustion air comprises an outlet connection for combustion air, which connects the flow channel for combustion air to the pre-heater for combustion air. In pre-heaters for combustion air comprising more than two sectors, there is, in practice, more than one outlet connection for combustion air, however, also, in case there are several outlet connections for combustion air, they are simply referred to as "an outlet connection for combustion air".

According to a preferred embodiment of the present invention, the pre-heater for combustion air is arranged in such a way that the outlet connection for combustion air is at least partially, most preferably, complete, outside the area underneath the back pass. When the outlet connection for combustion air is outside the area underneath the back pass, the flow channel, or flow channels, of combustion air can be led to the furnace via a most advantageous route. It is not necessary to especially form extensions or special bends in the flow channel for combustion air leading to the furnace, so-called feed channels for combustion air, in order to pass the back pass or the flue gas channel. The shortness of the air channels and the simple geometry thereof diminish the pressure loss in the channels, whereby the power consumption of the blowers for combustion air diminishes or, alternatively, the cross section of the air channels can be diminished, thus, minimizing their costs.

When the thermal power boiler comprises only one pre-heater for combustion air, the outlet connection for combustion air of the pre-heater can preferably be located, with respect to the inlet connection for flue gas, either to the furnace side or opposite to the furnace, whereby the inlet connection for flue gas and the outlet connection for combustion air are arranged one after the other in the direction of the normal of the rear wall of the furnace. Most preferably, the outlet connection for combustion air and the inlet connection for flue gas are, however, arranged one after the other in the direction of the horizontal cross section of the rear wall of the furnace, whereby the inlet channel for combustion air can preferably be arranged as a whole beside the back pass, as seen from the furnace. Thereby, the inlet channel for combustion air can extend towards the furnace without the necessity of bends to pass the back pass.

According to a most preferred embodiment of the present invention, a thermal power boiler comprises two parallel connected pre-heaters for combustion air, which are arranged symmetrically side by side with respect to the center normal of the rear wall of the furnace. In other words, the thermal power boiler comprises two parallel connected pre-heaters for combustion air, which are arranged one after the other in the direction of the rear wall of the furnace. Thereby, both pre-heaters for combustion air are preferably connected to a separate inlet channel for flue gas, in other words, a branch of the inlet channel for flue gas, the other end of which being connected to the lower portion of the back pass, which both branches of the inlet channel for flue gas comprise two adjacent channel portions, of which adjacent channel portions, one is connected to a front portion of the back pass and the other to a rear portion of the back pass.

The adjacent pre-heaters for combustion air are preferably arranged in such a way that the inlet connections for flue gas, or both of them, are at least partially, more preferably, mainly, and most preferably, completely, underneath the back pass. Respectively, the outlet connections for combustion air are preferably at least partially, more preferably, mainly, and most preferably, completely outside the area underneath the back pass. The pre-heaters for combustion air are thereby preferably directed in such a way that the outlet connection for combustion air of both pre-heaters for combustion air is on the furnace side or opposite to the furnace with respect to the inlet connection for flue gas. Most preferably, the pre-heaters for combustion air are, however, directed in such a way that the outlet connections for combustion air are symmetrically to the opposite directions, so that the outlet connections for combustion air and the inlet connections for flue gas are one after another in the direction of the rear wall of the furnace.

According to a preferred embodiment of the present invention, a by-pass of the pre-heaters for combustion air is arranged between the branches of the flue gas channels leading to the adjacent pre-heaters for combustion air. Most preferably, the by-pass of the pre-heaters for combustion air comprises a pre-heater for feed water in a thermal power boiler.

BRIEF DESCRIPTION OF THE DRAWINGS

The invention is described in more detail below with reference to the accompany drawings, in which.

DETAILED DESCRIPTION OF THE PREFERRED EMBODIMENTS

Figure 1:
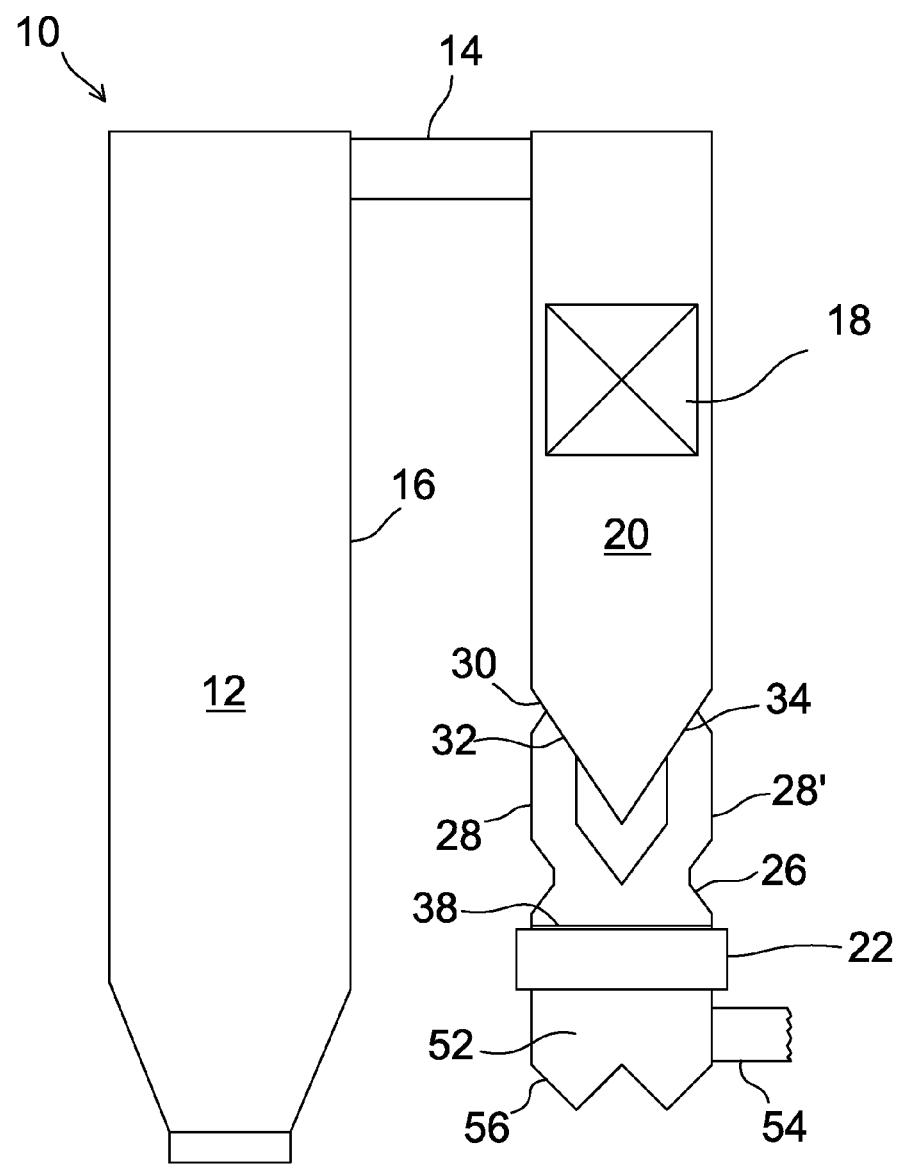
FIG. 1 is a schematic side view of a vertical cross section of a thermal power boiler in accordance with a preferred embodiment of the invention.
Figure 2:
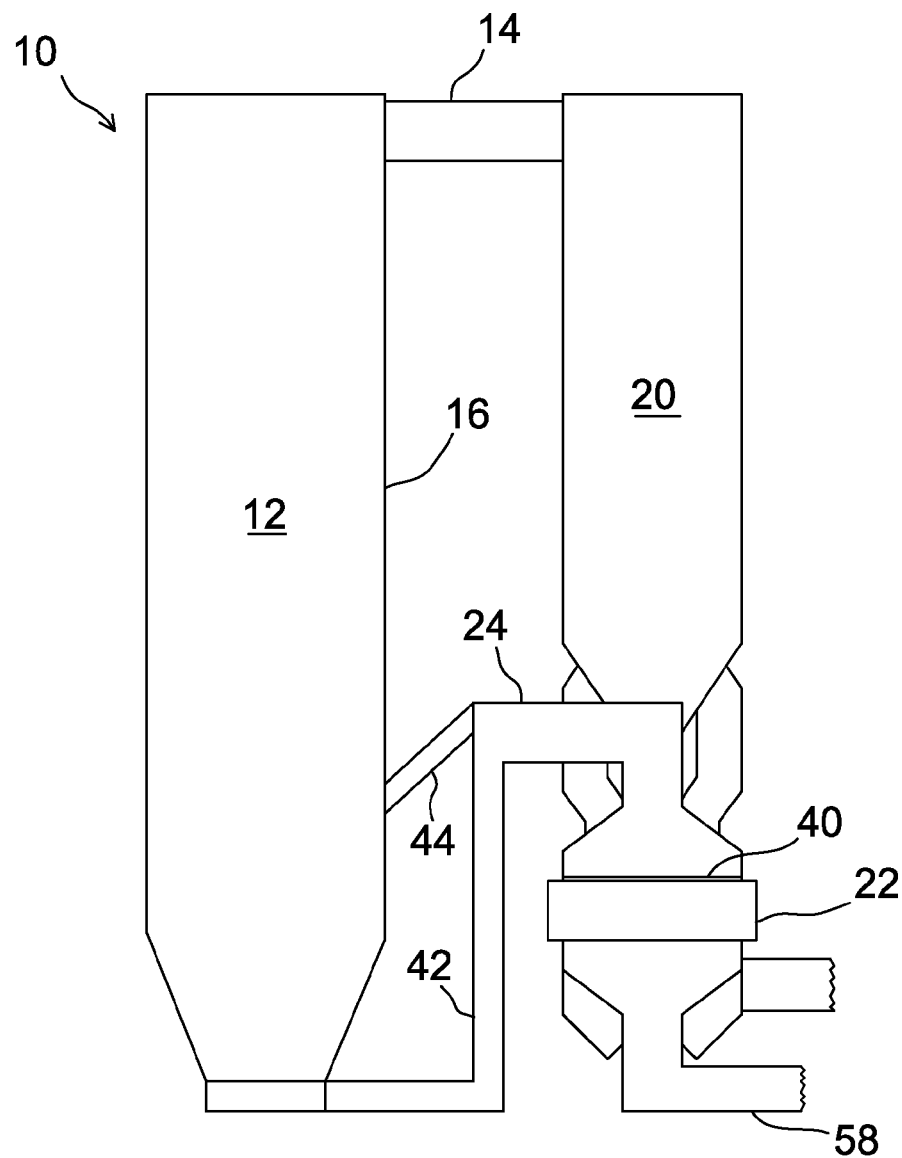
FIG. 2 is a second schematic side view of a vertical cross section of a thermal power boiler in accordance with FIG. 1.
Figure 3:
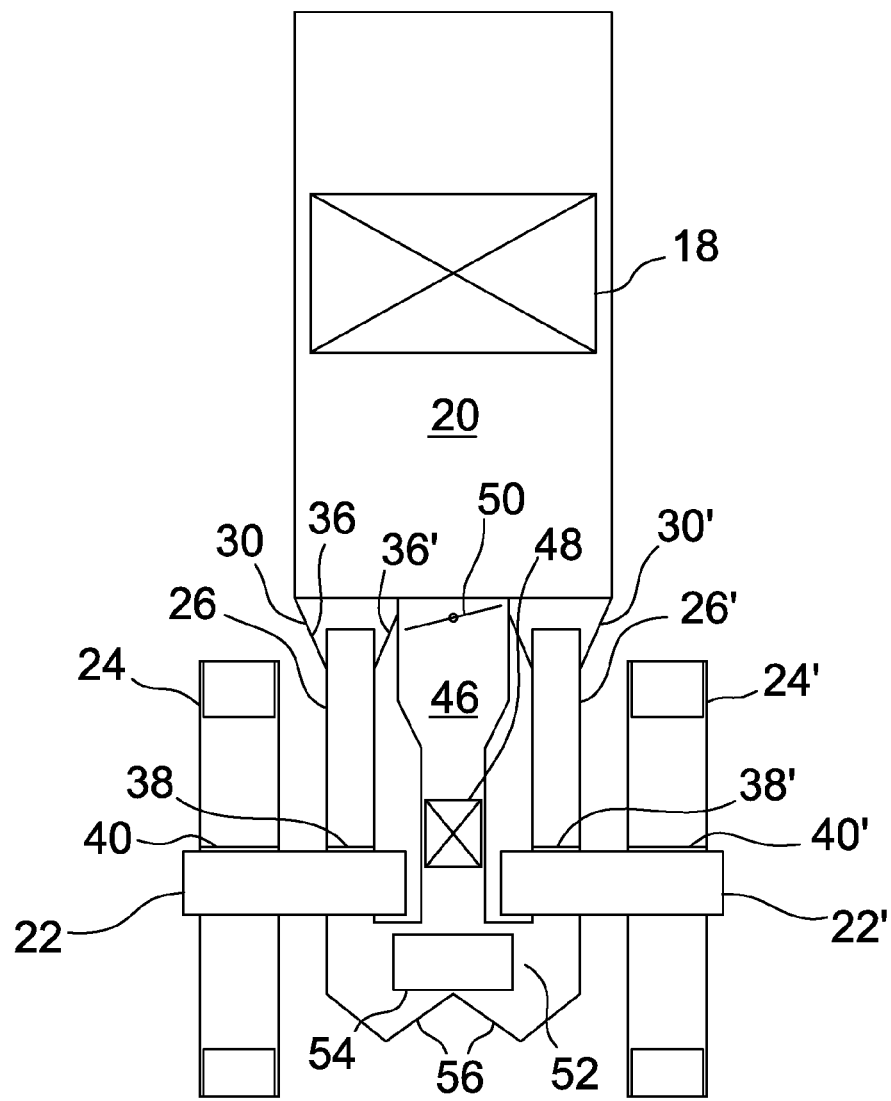
FIG. 3 is a schematic rear view of a vertical cross section of a thermal power boiler in accordance with FIG. 1.

FIGS. 1-3 disclose an exemplary thermal power boiler 10 in accordance with the invention. The thermal power boiler 10 comprises a furnace 12 and a flue gas channel 14 connected to the furnace 12, which flue gas channel 14 conducts flue gas from the furnace 12 through a back pass 20, arranged on the side of a rear wall 16 of the furnace 12 and provided with heat exchange surfaces 18, and inlet channels 26, 26' for flue gas to two parallel connected pre-heaters 22, 22' for combustion air. The thermal power boiler 10 can be, for example, a large circulating fluidized bed boiler, the electrical capacity of which is more than 500 MWe, or a pulverized coal boiler.

FIG. 1 is a vertical cross section of the thermal power boiler 10 taken perpendicularly to the rear wall 16 of the furnace 12 at the inlet channel 26 for flue gas. FIG. 2 is a corresponding vertical cross section taken at the point at the flow channel 24 for combustion air. FIG. 3 is a vertical cross section in the direction of the rear wall 16 of the furnace 12 at the back pass 20, respectively.

The pre-heaters 22, 22' for combustion air are preferably arranged according to the invention partially underneath the back pass 20. The pre-heaters 22, 22' for combustion air in the thermal power boiler 10 of FIGS. 1-3 are regenerative pre-heaters with a rotary plane. They can, however, also be of some other type, for example, recuperative pre-heaters for combustion air, in which a flow channel for combustion air leading combustion air to the furnace is arranged next to the inlet channel for flue gas connected to the pre-heater for combustion air.

Inlet channels for flue gas 26, 26' leading from the lower portion of the back pass 20 to the pre-heaters 22, 22' for combustion air comprise two adjacent channel portions 28, 28', which are connected to the opposite sides of the back pass 20. In the thermal power boiler 10 of FIGS. 1-2, the adjacent channel portions 28, 28' are connected to a front wall 32 and a rear wall 34 of ash hoppers 30, 30', in the lower portion of the back pass 20. In some cases, it can be advantageous to connect the adjacent channel portions 28, 28' elsewhere in the lower portion of the back pass 20, for example, immediately above the ash hoppers 30. The adjacent channel portions 28, 28' can be, in some cases, preferably connected to other opposite sides of the back pass 20 than the front and rear portion of the back pass 20, for example, to the side walls 36, 36' of the ash hopper 30. Connecting to the side walls of the ash hopper 30 is, in some cases, advantageous, especially, when the thermal power boiler 10 comprises only one pre-heater for combustion air.

As can be seen from FIGS. 1 and 3, the inlet channels 26, 26' for flue gas, in other words, both channel portions 28, 28' of the inlet channels for flue gas, are arranged underneath the back pass 20, whereby, especially, in the inlet connections 38, 38' for flue gas connecting to the pre-heaters 22, 22' for combustion air are arranged underneath the back pass 20. Respectively, as can be seen from FIG. 3, outlet connections 40, 40' for combustion air of the pre-heaters 22, 22' for combustion air are arranged outside the area underneath the back pass 20.

As can be seen in FIG. 3, the outlet connections 40, 40' are arranged symmetrically to opposite directions so that the inlet connections 38, 38' for flue gas and the outlet connection 40, 40' for combustion air are one after another in the direction of the horizontal cross section of the rear wall 16 of the furnace 12.

This arrangement provides that the inlet channels 26 for flue gas are as short and simple as possible, whereby the back pass 20 and the pre-heaters 22, 22' for combustion air form a compact entity and the size of the thermal power boiler 10 remains as small as possible. When the pre-heaters 22, 22' for combustion air are arranged underneath the back pass 20, the inlet channels for flue gas are, at least mainly, vertical. Thereby, the accumulation of ash in the inlet channels is considerably less than, for example, in an inlet channel of the prior art, including horizontal channel portions.

Moreover, the route of the flow channels 24, 24' for combustion air can be designed as advantageously as possible so that it is not necessary to include extra transfer channels or bends therein to pass the back pass 20 or the flue gas channel 14. Thereby, the pressure loss taking place in the flow channel for combustion air is as small as possible, which saves in the power consumption of the blower (not shown in FIGS. 1-3) in the inlet channel 58 for combustion air.

The exemplary thermal power boiler 10, disclosed in FIGS. 1-3, is a fluidized bed boiler, in which the flow channel 24 for combustion air comprises two branches 42, 44, which transfer primary air to the bottom of the furnace 12 and secondary air above the bottom of the furnace 12, respectively. If the thermal power boiler 10 is a pulverized coal boiler, the branches of the flow channel for combustion air lead primary air to a coal pulverizer and secondary air to burners. In reality, the combustion air to be conducted to different locations is usually divided apart already prior to the pre-heater for combustion air, whereby the pre-heater for combustion air comprises numerous flow sectors for combustion air, each of which is connected with a separate outlet connection for combustion air. For simplicity, FIG. 2 shows only one outlet connection for combustion air 40, 40' in each pre-heater 22, 22' for combustion air.

A by-pass channel 46 of the pre-heaters for combustion air is arranged between the inlet channels 26, 26' for flue gas leading to the pre-heaters 22, 22' for combustion air, which by-pass channel 46 advantageously comprises a pre-heater 48 for feedwater of the thermal power boiler 10. The by-pass channel 46 preferably comprises a means, for example, a control valve 50, for controlling the amount of flue gas to be led to the by-pass channel 46. Preferably, the flue gases cooled in the pre-heaters 22, 22' for combustion air and in the pre-heater 48 for feed water of the by-pass channel 46 are gathered to a common turn channel 52 arranged underneath the pre-heaters 22, 22' for combustion air before they are guided further through the outlet channel 54 for flue gas, for example, through a dust separator, to a stack (not shown in FIGS. 1-3). A compact construction is obtained by arranging a by-pass channel 46 of the pre-heaters for combustion air between the inlet channels 26, 26' for flue gas. Further, a separate ash hopper below the by-pass channel 46 can then be left out, and ash from the flue gas can be gathered to common ash hoppers 56.

The invention has been described above with reference to some exemplary embodiments, but the invention also covers various combinations or modifications of the disclosed embodiments. Thus, it is obvious that the invention is not intended to be limited only to the embodiments disclosed above, but it includes numerous other embodiments, which are limited merely by the appended claims and their definitions.

The invention claimed is:

1. A thermal power boiler comprising:
   a furnace having a rear wall;
   a flue gas channel connected to the furnace, the flue gas channel comprising a vertical back pass arranged on the rear wall side of the furnace, the vertical back pass comprising a lower portion;
   an ash hopper in the lower portion of the back pass, the ash hopper having (i) a front wall, (ii) a rear wall, and (iii) two sidewalls;
   two parallel connected preheaters for preheating combustion air, which are arranged symmetrically with respect to a center normal to the rear wall of the furnace, wherein a separate inlet channel for flue gas connects each of the pre-heaters for preheating the combustion air to the lower portion of the back pass, which each separate inlet channel for flue gas comprises vertical portions and two adjacent channel portions, one adjacent channel portion being directly connected to the front wall of the ash hopper and the other adjacent channel portion being directly connected to the rear wall of the ash hopper; and
   a flow channel for combustion air, arranged adjacent to the inlet channel channels for flue gas, to lead the pre-heated combustion air to the furnace.

2. A thermal power boiler in accordance with claim 1, wherein at least one of the inlet channels for flue gas is at least partially underneath the back pass.

3. A thermal power boiler in accordance with claim 2, in which each of the pre-heaters for preheating the combustion air comprises an inlet connection for flue gas, wherein each of the inlet connections for flue gas is positioned underneath the back pass.

4. A thermal power boiler in accordance with claim 3, in which each of the pre-heaters for preheating the combustion air comprises an outlet connection for combustion air, which connects a corresponding flow channel for combustion air to a respective pre-heater for preheating the combustion air, wherein the outlet connections for combustion air is are outside an area underneath the back pass.

5. A thermal power boiler in accordance with claim 4, wherein the inlet connections for flue gas and the outlet connections for combustion air are arranged one after the other in a direction of a normal to the rear wall of the furnace.

6. A thermal power boiler in accordance with claim 1, wherein each of the pre-heaters for preheating the combustion air is a regenerative pre-heater for preheating the combustion air.

7. A thermal power boiler in accordance with claim 6, wherein each of the pre-heaters for preheating the combustion air comprises a rotary plane provided with a battery of a heat storage mass.

8. A thermal power boiler in accordance with claim 7, wherein each of the pre-heaters for preheating the combustion air has a vertical rotational axis.

9. A thermal power boiler in accordance with claim 1, in which each of the pre-heaters for preheating the combustion air comprises an inlet connection for flue gas and an outlet connection for combustion air.

10. A thermal power boiler in accordance with claim 1, further comprising a respective by-pass channel, of each of the pre-heaters for preheating the combustion air, arranged between the separate inlet channels for flue gas connected to the corresponding pre-heaters for preheating the combustion air.

11. A thermal power boiler in accordance with claim 10, wherein each of the respective by-pass channels of the pre-heaters for preheating the combustion air comprises a corresponding pre-heater for preheating feed water of the thermal power boiler.

* * * * *